UNITED STATES PATENT OFFICE.

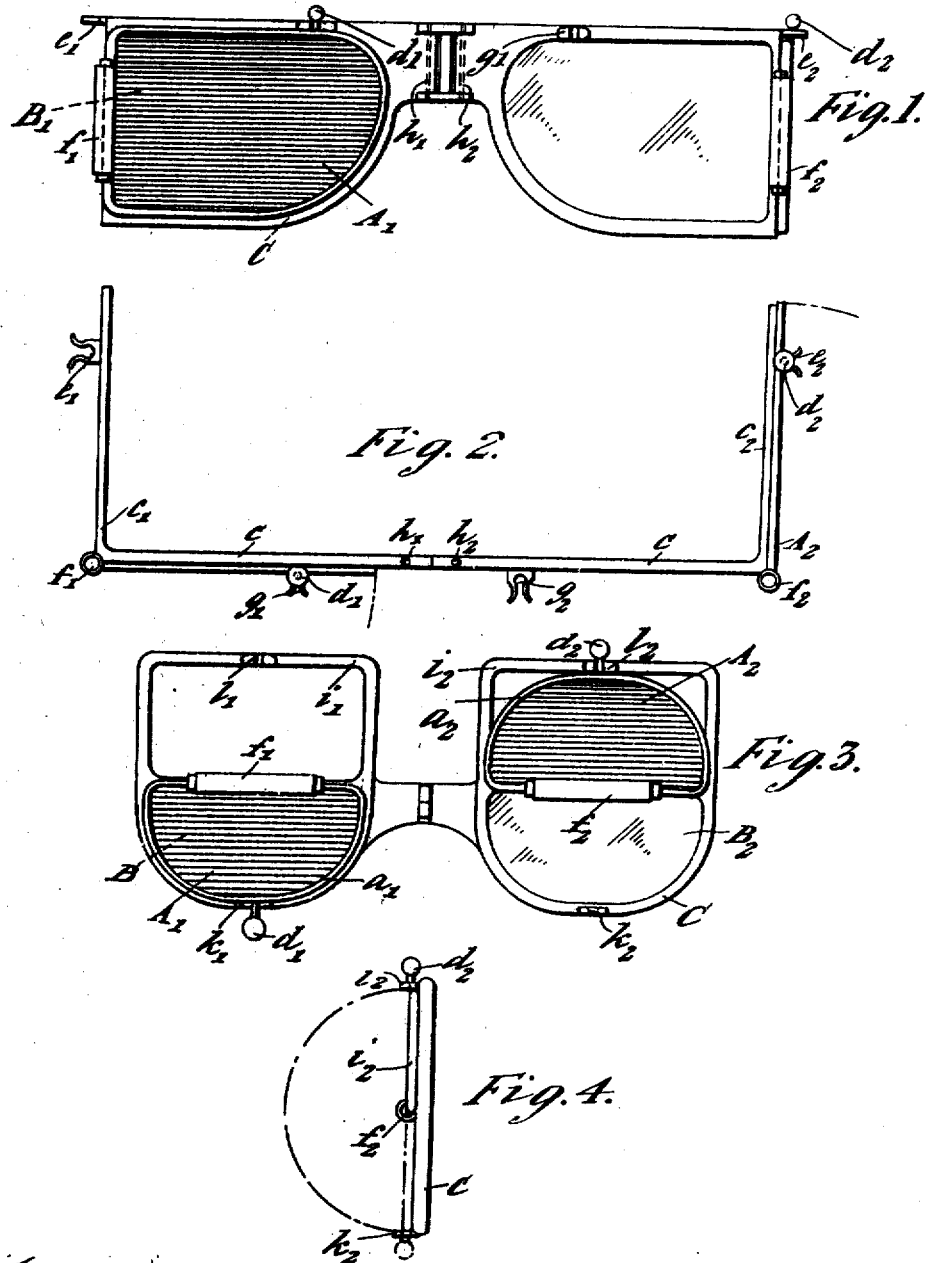

JOSEPH H. RAPHAEL AND HENRY H. SCOTT, OF LONDON, ENGLAND.

SPECTACLES OR GOGGLES.

1,338,526.

Specification of Letters Patent. Patented Apr. 27, 1920.

Application filed May 26, 1919. Serial No. 299,858.

*To all whom it may concern:*

Be it known that we, JOSEPH HENRY RAPHAEL and HENRY HAMILTON SCOTT, both subjects of the King of Great Britain, residing in London, England, have jointly invented a certain new and useful Improvement in Spectacles or Goggles, of which the following is a specification.

The invention relates to spectacles or goggles in which suitably colored glasses are provided in frames hinged to the main frame, so that they can lie over the ordinary clear lenses or glasses, under conditions in which the glare due to a strong light might inconvenience the wearer, and can be folded back out of the line of vision when they are not required.

For the purpose of withstanding the stress due to strong air currents to which the glasses of motor drivers and more especially of aviators are exposed, it is necessary that the colored glasses should, when not in use, be supported against displacement and, according to the invention, these glasses in their inoperative position are held in contact with an extension of the main frame, which forms a support for and prevents the glasses from being damaged or displaced.

Spring hinges are preferably arranged in known manner to bring the colored glasses to the normal position in which they are inoperative, and spring clips are adapted to secure them in front of the goggles.

Preferably each colored glass is held in a separate frame, but a single frame might be provided for both glasses. In the accompanying drawings which represent examples of constructions according to the invention, Figure 1 is a front view and Fig. 2 a plan of spectacles or goggles in which the frame of each colored glass is hinged about a vertical member. Figs. 3 and 4 are respectively front and side views of a modification in which each colored glass is hinged about a horizontal member.

Referring to Figs. 1 and 2, the colored glass A' on the left is shown in front of the transparent lens or glass B', the corresponding colored glass A² on the right is shown as folded back in contact with the extension c² of the main frame C in which it is held by the catch d² engaging in the clip e². The vertical spring hinges f', f² tend to return the colored glasses from the positions in which they are held by spring clips, as shown at g², to the folded back position shown on the right of the figure. The main frame is shown as hinged at h', h². Similar catches d', and clips e' and g' are provided on the left hand side of the figure.

In the arrangement shown in Figs. 3 and 4, the spring hinges f', f² about which the frames a', a² can turn are horizontal and the frames a', a² of the colored glasses in the folded back positions lie against extensions i', i² of the main frame C; catches d', d² attached to the frames a', a² are held by clips l' l² in the normal positions and by clips k', k² in the operative positions.

Having thus described the nature of the said invention and the best means we know of carrying the same into practical effect, we claim:—

1. In an eyeglass the combination of a main frame, a pair of lenses carried in said frame, colored glasses hinged to said frame and adapted in the operative position to lie in front of said lenses, and extensions of said frame against which said colored glasses are securely held in their inoperative position.

2. In an eyeglass the combination of a main frame, a pair of lenses carried in said frame, colored glasses hinged to said frame and adapted in the operative position to lie in front of said lenses, and extensions of said frame integral therewith against which said colored glasses are securely held in their inoperative position.

3. In an eyeglass the combination of a main frame, a pair of lenses carried in said frame, colored glasses hinged to said frame and adapted in the operative position to lie in front of said lenses and extensions of said frame against which said colored glasses are securely held in their inoperative position, and clips for holding said glasses against the main frame both in the operative and inoperative positions.

4. In an eyeglass the combination of a main frame, a pair of lenses carried in said frame, colored glasses hinged to said frame and adapted in the operative position to lie in front of said lenses and vertical extensions of said frame against which said colored glasses are securely held in their inoperative position.

In witness whereof we have signed our names to this specification.

JOSEPH H. RAPHAEL.
HENRY H. SCOTT.